United States Patent [19]

Nathwani

[11] Patent Number: 5,407,578
[45] Date of Patent: Apr. 18, 1995

[54] WASTE WATER TREATMENT PROCESS

[75] Inventor: Surendra Nathwani, Hemel Hempstead, United Kingdom

[73] Assignee: Klargester Environmental Engineering Limited, Buckinghamshire, United Kingdom

[21] Appl. No.: 70,398

[22] PCT Filed: Dec. 6, 1991

[86] PCT No.: PCT/GB91/02172

§ 371 Date: Jun. 7, 1993

§ 102(e) Date: Jun. 7, 1993

[87] PCT Pub. No.: WO92/10431

PCT Pub. Date: Jun. 25, 1992

[30] Foreign Application Priority Data

Dec. 10, 1990 [GB] United Kingdom ............... 9026787

[51] Int. Cl.⁶ ............................................. C02F 3/08
[52] U.S. Cl. ................................. 210/619; 210/626; 210/150
[58] Field of Search ............... 210/619, 150, 151, 622, 210/626, 624

[56] References Cited

U.S. PATENT DOCUMENTS

| | | | |
|---|---|---|---|
| 3,428,555 | 2/1969 | Kitagawa et al. | 210/619 |
| 4,468,326 | 8/1984 | Kawert | 210/619 |
| 4,729,828 | 3/1988 | Miller | 210/150 |
| 5,248,422 | 9/1993 | Neu | 210/619 |

FOREIGN PATENT DOCUMENTS

| | | |
|---|---|---|
| 161077 | 11/1985 | European Pat. Off. |
| 2323640 | 4/1977 | France |
| 1958247 | 5/1971 | Germany |
| 2119357 | 11/1983 | United Kingdom |

Primary Examiner—Thomas Wyse
Attorney, Agent, or Firm—Dann, Dorfman, Herrell and Skillman; Henry H. Skillman

[57] ABSTRACT

Waste water containing biodegradable matter is fed to a rotating biological contactor (RBC) (15) from an inlet tank (10) and is discharged from the RBC-containing chamber into a humus tank (21). The RBC is divided into separated upstream (15A) and downstream (15B) sections, the chamber (17) containing the downstream section being fed with water to be processed at a controlled rate from the chamber (16) containing the upstream section. A balancing chamber, for isolating the downstream section of the RBC from variations in flow of waste water to the inlet tank (10), includes the upstream section (15A, 16) of the RBC which can act sacrificially in respect of toxic incursions in the waste water.

9 Claims, 2 Drawing Sheets

WASTE WATER TREATMENT PROCESS

FIELD OF THE INVENTION

This invention relates to an improved method of treating waste water containing biodegradable matter and to improved plant for implementing the method.

DISCUSSION OF PRIOR ART

It is known to break down environmentally damaging matter in sewage or other waste water by means of bacteria (e.g. naturally-occurring microbes) and to encourage the growth of such bacteria and their digestion of the waste matter thus creating biomass layers of media of an RBC (Rotating Biological Contactor) which is supported partly in air and partly in the waste water. The RBC is slowly rotated to alternately immerse the biomass layers in the waste water and then to expose them to atmospheric oxygen.

Normally the waste water is led to the RBC from an upstream primary settlement tank and leaves the RBC to flow into a final settlement tank from which, now purified of at least the biodegradable material and suspended solids, it flows on to the environment.

The usual procedure is to allow plant throughput to be determined by the inflow of waste water and to dimension the treatment plant so that even on the expected maximum rate of input flow, an adequate residence time of the waste water in contact with the RBC will be obtained. Such an arrangement works well in most situations but in some extreme operating conditions (e.g. where biocidal chemicals and petrochemical-based cleaning agents may be periodically discharged in the waste water) a steady decline in operating efficiency of the plant has been noted which can only be resolved by putting the plant out of commission and cleaning out all solid and liquid material contained therein.

GB-A-2119357, EP-A-0161077 and U.S. Pat. No. 4729828 all disclose waste water treatment apparatus in which treatment is effected in at least two biological stages each containing a rotating biological contactor but there is no suggestion in any of these documents that the upstream one of these two stages forms a part of a flow-balancing chamber for the apparatus.

By arranging for a biological contactor to form a part of the flow-balancing chamber, the plant is able to cope with waste water flows that at least occasionally contain toxic substances that do inhibit the capacity of the biomass to treat the biodegradable matter in the waste water. Because a minor part of the biomass available on the RBC is located in the flow-balancing chamber, this minor part can, if occasion requires, act sacrificially to absorb, or at least reduce, the toxicity and thereby prevent the flow of toxic substances into contact with the major part of the biomass on the RBC.

We have now found that by the simple expedient of providing flow balancing at the upstream end of the RBC (and optionally also by dividing the primary settlement tank into two) it is possible to provide plug flow conditions in the downstream part of the RBC and ensure that even if a significant proportion of biocides is present in the input flow, these can be effectively diluted in the primary settlement tank thereby ensuring improved biodegradation on the RBC, i.e. conditions approaching BOD removal kinetics which are essentially first order with respect to BOD at the resulting and applied mass BOD rates per unit area of RBC media per day.

The invention is equally applicable to a compact integrated sewage treatment plant designed to serve a single house (e.g. a "Biodisc",(RTM) plant having an RBC media bank housed in one tank with upstream primary and downstream settlement tanks) up to a large-scale treatment plant designed to serve a community of more than 1000 people where a septic (primary settlement) tank is likely to be provided separate from the RBC which in turn is separated from a humus or final settlement tank.

SUMMARY OF THE INVENTION

In its method aspect, the invention involves feeding a chamber containing a rotating biological contactor (RBC) with waste water from an inlet tank and discharging from the RBC-containing chamber into a humus tank, the RBC being divided into separated upstream and downstream sections, the chamber containing the downstream section being fed with water to be processed at a controlled rate from the chamber containing the upstream section and a balancing chamber is provided for isolating the downstream section of the RBC from variations in flow of waste water to the inlet tank, characterised in that the upstream section of the RBC forms part of the balancing chamber.

Suitably the upstream section represents less than 50% of the total biomass support area of the RBC. Conveniently the upstream section is between 20% and 40% of the total biomass support area and suitably around 30%.

Conveniently the inlet tank is divided into an upstream section which receives the waste water and is maintained at a constant water level and a downstream section which is part of the balancing chamber and is hydraulically linked to the chamber containing the upstream section of the RBC. In this way the downstream section of the inlet tank and the linked chamber containing the upstream section of the RBC vary in liquid level as inlet flow fluctuates from hour to hour and day to day while the upstream section of the inlet tank and the chamber containing the downstream end of the RBC remain at respective substantially constant liquid levels.

The humus tank may include a sump into which solids will settle and the method may include periodic removal of the settled humus sludge to an upstream point in the waste water treatment (e.g. to the primary settlement tank) or to a point facilitating removal from the plant.

In its apparatus aspect, the invention comprises an RBC rotating in a chamber fed from an inlet tank and discharging to a humus tank, the RBC chamber being divided into separated upstream and downstream sections, and is characterised in that the upstream section of the RBC chamber forms part of a flow-balancing chamber for the apparatus. Desirably the inlet tank is also divided into upstream and downstream sections, the upstream section of the RBC chamber and the downstream section of the inlet tank together forming the balancing chamber.

A liquid lift means can be provided between the sections of the RBC which is actuated by the rotational motion of the RBC (e.g. by the provision of cups or the like on the RBC) but an Archimedean screw, peristaltic pump, air lift pump or electric pump could also be used.

BRIEF DESCRIPTION OF THE DRAWINGS

The invention will now be further described, by way of example with reference to the accompanying drawings, in which.

DESCRIPTION OF PREFERRED EMBODIMENT

Figure 1:
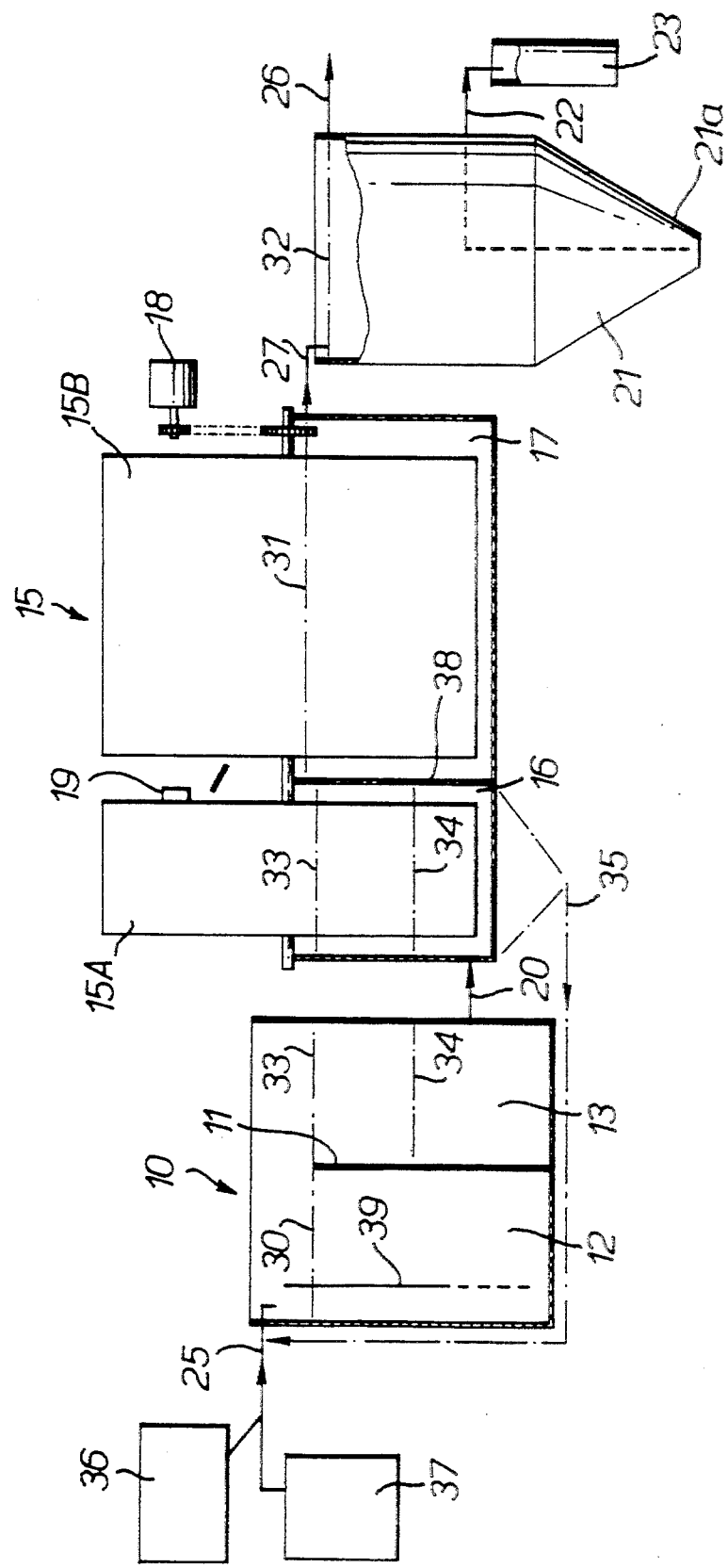
FIG. 1 is a schematic sectional side elevation of a first form of plant operating in accordance with the method of the invention.

Referring to FIG. 1, a primary settlement tank 10 is divided by a weir 11 into a first stage chamber 12 and a second stage chamber 13.. An RBC 15 is divided into an upstream rotor section 15A constituting some 30% of the available biomass support areas and a downstream rotor section 15B providing the remaining 70%.

Sections 15A and 15B are rotatably supported in separated RBC chambers 16 and 17, respectively. Both rotor sections are driven by the same motor 18 and section 15A includes at least one bucket 19 on its downstream end to lift a measured volume of liquid out of chamber 16 and to discharge it into chamber 17 once each 360° rotation of rotor section 15A.

Chambers 16 and 13 are linked by plumbing 20 allowing flow of liquid from chamber 13 to chamber 16.

Downstream of chamber 17 is a humus tank 21, the latter being shaped to provide a sludge sump 21a from which an output pipe 22 leads to a sludge accumulating tank 23 or to an upstream part of the plant e.g. the tank 10.

An inlet for waste water into the plant is shown at 25 and an outlet for purified water is shown at 26. Under operating conditions, the liquid levels throughout the plant will be as shown by the dotted level lines 30 to 34.

In chamber 12 the liquid level is constantly at level 30 set by the weir 11. In chamber 17 and tank 21 the liquid levels are constant respectively at 31 and 32 and are set by the level of an outlet 27 from the chamber 17 and the pipe 26 (or outlet weir) from tank 21. In chambers 13 and 16, however, the liquid level can vary anywhere between lines 33 and 34 due to the fact that flow into chamber 13 is related to the rate at which inlet waste water flows into chamber 12, whereas the outflow rate from chamber 16 is constant provided the RBC section 15A is rotating at a constant rate and providing the level in chamber 16 is not close to the lower level limit 34. Levels 30, 33, 31 and 32 could be the same, but need not be.

Controlling the levels in the manner described has a dramatic effect on the performance of the plant particularly so in the presence of periodic discharges of biocidal and petrochemical-based materials in the waste water entering the chamber 12. It is felt that this surprising improvement in long-term efficiency derives from the fact that chambers 12 and 13 serve as a septic tank and the dwell time of fresh effluent in the tank 10 under conditions of low redox oxidation potential (ROP) will reduce the toxic effect of many biocides so that when they are released from chamber 13 they have become wholly or partly degraded and diluted to the point where their toxic effect is markedly reduced there by reducing the inhibition of the biodegradation process of the RBC in the upstream chamber 16 and certainly not damage the biomass on the RBC section 15B.

The drawing shows (in chain lines) a link 35 between a bottom part of the chamber 16 and the chamber 12 and this can be useful for passing sludge which drops off the rotor section 15A back into the tank 10 e.g. via the inlet 25.

The upstream section 15A of the RBC which is housed in the chamber 16 forms the upstream part of a biozone and contributes to the process in the following manner:

(a) The inhibitory effect of any toxic chemicals in the waste water will be substantially reduced or eliminated in the upstream section of the RBC. The chemicals would undergo primary biological degradation and any detrimental effuect on the biochemistry will be reduced or buffered. This will enable the downstream section of the RBC to perform consistently without inhibition.

(b) The upstream section of the RBC will improve the Redox Oxidation Potential (ROP) by reducing or overcoming septicity of the liquid emanating from the septic tank 10.

(c) The downstream chamber 17 will receive waste water from the upstream chamber 16 at a controlled rate. The fixed film process of BOD removal on an RBC is first order with respect to BOD at low organic mass loading rates and therefore the downstream section RBC's efficiency is improved. Also, the velocity constants of BOD removal (BOD due to some chemicals present in waste water) are small, therefore high retention times achieved on the downstream RBC section due to balancing upstream, ensures a high degree of consistent BOD removal.

(d) The fixed film process of ammoniacal nitrogen removal in the RBC is between zero and half order with respect to ammoniacal nitrogen at the low mass loading rates, and also the velocity constants are very small. The downstream RBC section 15B is provided with stable conditions (with respect to flow rate and pollution load) for the process to operate as near the ideal conditions as possible and thereby enabling a high degree of treatment consistently.

(e) By removing and returning sludge from the upstream chamber 16 the BOD load, due to solids, otherwise applied to the downstream RBC section, is reduced. This therefore improves the overall process efficiency.

The following example further illustrates the invention.

A farm-based RBC conventional treatment plant which received waste water from a domestic dwelling 36 (average flow 1000 liters/day) and a milking parlour 37 (average flow 100–150 liters/day) was found to deteriorate in performance over a ten week cycle. At start-up, the BOD (biological oxygen demand) of the treated water discharged from the plant outlet 26 was 30 ppm (30 mg/liter) but this gradually increased to 100 ppm over a period of a few weeks. Cleaning out the plant and restarting saw a return to the acceptable initial <30 ppm figure but again a steady deterioration of performance set in over the following weeks requiring yet another clean-out of the plant when the efficiency again became unacceptable. It is suspected that chemicals in the waste water from the milking parlour 37 (e.g. to name one M.I. acid) acted as a biocide.

On converting the plant to operate in accordance with the method of this invention, the waste water from the milking parlour 37 and the domestic sewage from the dwelling 36 were both discharged into the first stage 12 of the septic tank 10. The clarified mixed liquid then discharged over the weir 11 into the second stage 13 of the septic tank which now acts as part of a balancing chamber.

The first stage of the RBC is separated from the second stage by a fixed baffle 38. The second chamber 13 of the septic tank being linked with the first stage chamber 16 of the RBC hydraulically at a lower submerged level via the plumbing 20, acts together as the balancing chamber for the plant. The balanced flow is transferred from the first stage RBC chamber 16 to the second stage RBC chamber using the bucket(s) 19. In the example given, this rate would be of the order of a forward feed rate of 1.2 liters/min..

The first section 15A of the RBC acts to condition the sewage and will overcome any partial inhibition which may occur because of biocides persisting in the flow. The balancing in chambers 13 and 16 will enable the second section 15B of the RBC to operate in a plug flow mode at the desired mass BOD loading rate (in the example given a rate of approximately 3 gms/m$^2$/day). The controlled flow throughput in chamber 17 increases retention time in the RBC thus taking care of the low velocity constant and also enables the humus tank 21 to operate at an almost constant flow. The mixing of the domestic sewage and milking parlour waste water in chamber 12 ensures more uniform liquid composition and adequate dilution levels for the washing liquids from parlour 37 thus reducing the organic and chemical shock loads on the RBC.

To ensure good mixing of input water upstream of the weir 11, a baffle 39 can be provided adjacent to the inlet 25.

The RBC speed should be set (e.g. at 2 rpm) to avoid excess oxygen in the bulk liquid in chamber 17. This is to create oxygen-limiting conditions in the bulk liquor and provide oxidation of the pollutants in the biofilm on the rotor section 15B rather than the creation of mixed liquid suspended growths.

The humus tank 21 serves as a proper settling tank which facilitates consolidation of sludge and its effective removal via the pipe 22. To avoid disturbing the settled sludge, a desludging operation can be carried out by timer controlled, pump-assisted hydrostatic means (not shown). The sludge recovered from the pipe 22 could be removed from the plant at intervals but could be returned to the septic tank 10 if desired.

With the adaptation described, the plant receiving the output from 36 and 37 operated in steady state conditions with less than 30 ppm BOD in the discharged liquid.

It is our knowledge that naturally occurring microorganisms can eventually adapt to even quite hostile environments if the environment is not constantly varying. The balancing of the flows into the RBC chamber 16 appears to enable this to be achieved. If naturally-occurring microorganisms have problems adapting to the environment, cultured adapted microorganisms with inbuilt resistance to the chemicals in the wash water can be used to inoculate the plant. However inoculation of the plant with cultured microorganisms should only rarely be necessary.

Figure 2:
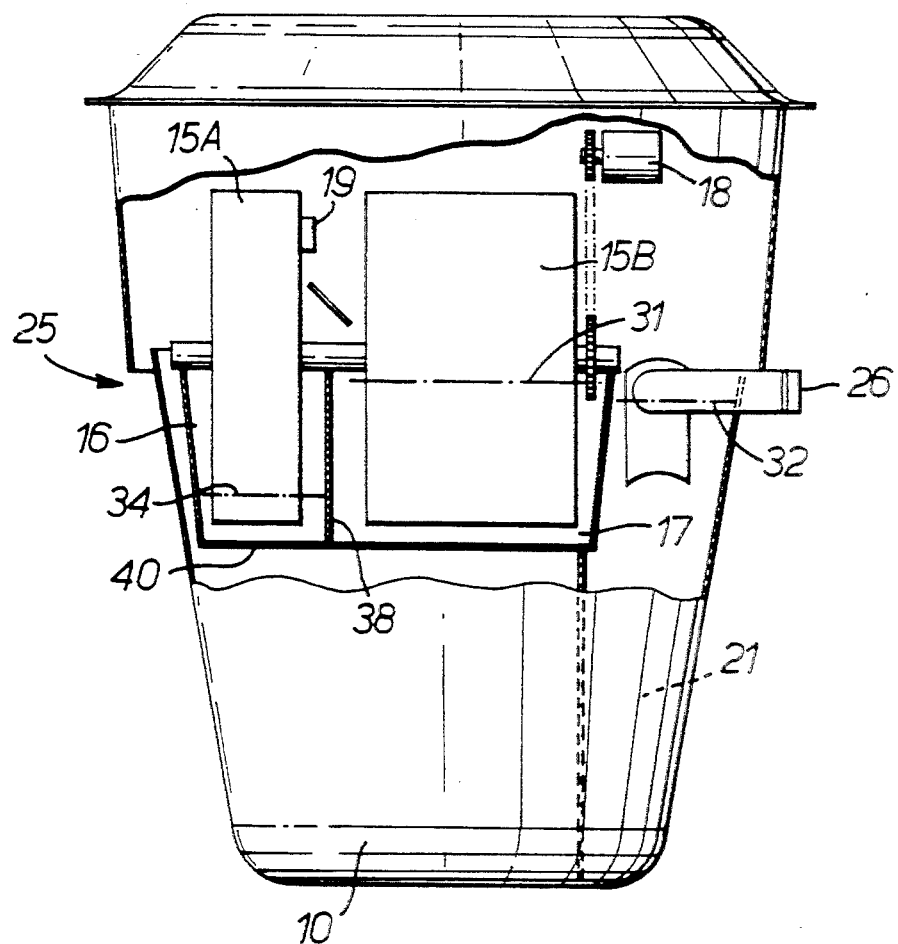
FIG. 2 is a sectional side elevation of the invention as applied to a Biodisc unit.

Although FIG. 1 shows a plant with separated primary tank 10, chambers 16, 17 and humus tank 21, the invention can equally well be applied to integrated plant (such as that known under our Registered Trade mark "BIODISC") in which a single tank is sectioned to provide interconnected volumes 10, 16, 17 and 21 and such a tank is shown in FIG. 2. In this plant a slot 40 is provided in chamber 16 to allow sludge dropping off the rotor section 15A to pass back into the volume 10.

I claim:

1. In a method of processing wastewater containing biodegradable matter which involves feeding a chamber containing a rotating biological contactor (RBC) with wastewater from an inlet tank and discharging from the RBC-containing chamber into a humus tank, the RBC being divided into separated upstream and downstream sections, the chamber containing the downstream section being fed with water to be processed at a controlled rate from the chamber containing the upstream section and a balancing chamber is provided for isolating the downstream section of the RBC from variations in flow of wastewater to the inlet tank, the improvement which comprises the upstream section of the RBC forming part of the balancing chamber.

2. The method of claim 1, in which the upstream section represents less than 50% of the total biomass support area of the RBC.

3. The method of claim 2, in which the upstream section is between 20% and 40% of the total biomass support area.

4. The method of claim 3, in which the upstream section is 30% of the total biomass support area.

5. The method of claim 1, in which the inlet tank is divided into an upstream section which receives the waste water and is maintained at a constant water level and a downstream section which is part of the balancing chamber and is hydraulically linked to the chamber containing the upstream section of the RBC.

6. The method of claim 1, in which the humus tank includes a sump into which solids settle and the method includes periodic removal of the settled humus sludge to an upstream point in the waste water treatment.

7. The method of claim 6, in which the removed sludge is returned to a primary settlement tank.

8. The method according to claim 1, in which a liquid lift means is provided between sections of the RBC and is actuated by the rotational motion of the RBC.

9. The method according to claim 8, in which cups are fitted on the RBC to lift liquid between the sections of the RBC chamber.

* * * * *